United States Patent Office 2,865,967
Patented Dec. 23, 1958

2,865,967

TERTIARY VINYL ETHYNYL CARBINOLS AND PROCESS OF PREPARATION

Abraham Bavley, Brooklyn, William M. McLamore, Flushing, and Morton Harfenist, Yonkers, N. Y., assignors to Chas. Pfizer & Co., Inc., Brooklyn, N. Y., a corporation of Delaware No Drawing. Application November 16, 1953
Serial No. 392,468

11 Claims. (Cl. 260—632)

This invention relates to a process for preparing unsaturated tertiary carbinols, and more particularly, to a process for preparing unsaturated aliphatic tertiary carbinols which are useful as intermediates in organic synthesis, as organic solvents and as hypnotic and/or anticonvulsant agents. The invention further relates to certain new unsaturated tertiary carbinols prepared by such process.

The present application is a continuation-in-part of our copending application Serial No. 317,348, filed October 28, 1952, now U. S. Patent No. 2,824,041. In that application there is described a process in which useful unsaturated tertiary carbinols are prepared by the condensation under anhydrous conditions of an $\alpha,\beta$-unsaturated ketone, such as ethyl vinyl ketone and the like, with an acetylenic compound. These ketones are frequently prepared by the dehydrohalogenation of a halogenated ketone with an organic base, as exemplified by diethylaniline.

In accordance with the present invention, however, a separate dehydrohalogenation step is obviated by preparing the desired unsaturated tertiary carbinols directly from an aliphatic $\beta$-haloalkyl ketone having at least one hydrogen atom in the $\alpha$ position. While the direct condensation of certain halogenated ketones with a metal acetylide is described in our aforesaid application, it has now been found that a wide variety of useful compounds may be prepared by this process, for example, compounds conforming to the following general formula:

$$R_1-\underset{\underset{OH}{|}}{C}=\underset{|}{\overset{R_2}{C}}-\underset{|}{\overset{R_3}{C}}-\underset{|}{\overset{R_4}{C}}-C\equiv CR_5$$

wherein $R_1$ represents halogen, hydrogen or an alkyl group, such as alkyl groups having from 1 to 7 carbon atoms, $R_2$, $R_3$ and $R_5$ are hydrogen or alkyl groups having from 1 to 7 carbon atoms, and $R_4$ is an alkyl or alkenyl group having 1 to 7 carbon atoms. A number of compounds falling within this class are claimed in our aforesaid application, while other compounds and/or compositions containing the same are claimed in the following copending applications: Serial No. 286,012, filed May 3, 1952; Serial No. 296,744, filed July 1, 1952; Serial No. 296,745, filed July 1, 1952; all now abandoned, and Serial No. 349,938, filed April 20, 1953, and now Patent No. 2,746,900. A further group of novel compounds is embraced by the above formula when $R_4$ is an alkenyl group having from 1 to 7 carbon atoms, as exemplified by divinyl ethinyl carbinol and vinyl $\beta$-chlorovinyl ethinyl carbinol, and such compounds form a part of this invention. These compounds are useful intermediates in organic synthesis.

A wide variety of aliphatic $\beta$-haloalkyl ketones are useful in the process of this invention, illustrative of which are ketones conforming to the following general formula:

$$R_1-\underset{\underset{X}{|}}{\overset{R_2}{C}}-\underset{\underset{H}{|}}{\overset{R_3}{C}}-\underset{\underset{O}{\|}}{C}-R_4$$

$R_1$, $R_2$, $R_3$ and $R_4$ being as defined above, and X being halogen, preferably chlorine or bromine. A representative number of such ketones are hereinafter set forth.

Alkyl $\beta$-haloalkyl ketones, such as:

$$R_1-\underset{\underset{X}{|}}{\overset{R_2}{C}}-\underset{\underset{H}{|}}{\overset{R_3}{C}}-\underset{\underset{O}{\|}}{C}-R_4$$

$R_1$, $R_2$ and $R_3$ being hydrogen or alkyl, $R_4$ being alkyl, and X being halogen;

Methyl $\beta$-chloroethyl ketone
Propyl $\beta$-chloroethyl ketone
Isopropyl $\beta$-chloroethyl ketone
Heptyl $\beta$-chloroethyl ketone
Ethyl $\beta$-chloroethyl ketone
Ethyl $\beta$-chloropropyl ketone
n-Butyl $\beta$-bromoethyl ketone
Hexyl $\beta$-chlorononyl ketone
Methyl $\beta$-chloroisobutyl ketone
Propyl $\beta$-bromoisobutyl ketone
n-Butyl $\beta$-chloroisobutyl ketone
Methyl ($\alpha$-methyl-$\beta$-chloro-$\beta$-methylethyl) ketone
Methyl ($\alpha$-methyl-$\beta$-chloro-$\beta$-methylpropyl) ketone
Methyl ($\alpha$-methyl-$\beta$-chloro-$\beta$-methylbutyl) ketone Alkyl $\beta,\beta$-dihaloalkyl ketones, such as $$X-\underset{\underset{X}{|}}{\overset{R_2}{C}}-\underset{\underset{H}{|}}{\overset{R_3}{C}}-\underset{\underset{O}{\|}}{C}-R_4$$

$R_2$ and $R_3$ being hydrogen or alkyl, $R_4$ being alkyl, and X being halogen;

Methyl $\beta,\beta$-dichloroethyl ketone
Ethyl $\beta,\beta$-dichloroethyl ketone
Isopropyl $\beta,\beta$-dichloroethyl ketone
n-Butyl $\beta,\beta$-dibromopropyl ketone
Methyl $\beta,\beta$-dibromoisoamyl ketone
Ethyl $\beta,\beta$-dibromononyl ketone
Propyl $\beta,\beta$-dichloroisoamyl ketone
Methyl $\beta,\beta$-dichlorohexyl ketone
Ethyl $\beta,\beta$-dichlorooctyl ketone
Methyl $\beta,\beta$-dichlorononyl ketone $\beta,\beta'$-Dihaloalkyl ketones, such as $$R_1-\underset{\underset{X}{|}}{\overset{R_2}{C}}-\underset{\underset{H}{|}}{\overset{R_3}{C}}-\underset{\underset{O}{\|}}{C}-\underset{\underset{H}{|}}{\overset{H}{C}}-\underset{\underset{X}{|}}{\overset{H}{C}}-R$$

R, $R_1$, $R_2$, and $R_3$ being hydrogen or alkyl, and X being halogen;

$\beta,\beta'$-Dichlorodiethyl ketone
$\beta,\beta'$-Dichlorodipropyl ketone
$\beta,\beta'$-Dichlorodibutyl ketone
$\beta,\beta'$-Dibromodiheptyl ketone
$\beta,\beta'$-Dichlorodinonyl ketone
$\beta$-Chloroethyl,$\beta'$-chloropropyl ketone
$\beta$-Chloroethyl,$\beta'$-chlorobutyl ketone
$\beta$-Chloroethyl,$\beta'$-chloroheptyl ketone
$\beta$-Chloropropyl,$\beta'$-chloropropyl ketone
$\beta$-Chlorobutyl,$\beta'$-chlorohexyl ketone
$\beta$-Bromoethyl,$\beta'$-bromoisoamyl ketone β,β,β′-Trihaloalkyl ketones, such as

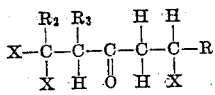

R, R₂, and R₃ being hydrogen or alkyl and X being halogen;

β,β,β′-Trichlorodiethyl ketone
β,β,β′-Trichlorodipropyl ketone
β,β,β′-Trichlorodibutyl ketone
β,β-Dichloroethyl,β′-chloropropyl ketone
β,β-Dichloropropyl,β′-chloroethyl ketone
β,β-Dichlorobutyl,β′-chloropropyl ketone
β,β-Dichloroisoamyl,β′-chloroethyl ketone
β,β-Dibromohexyl,β′-bromopropyl ketone
β,β-Dibromoisopropyl,β′-bromoethyl ketone
β,β-Dibromoethyl,β′-chloropropyl ketone β-Haloalkyl,β′-haloalkenyl ketones, such as

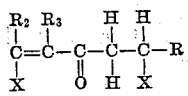

R, R₂ and R₃ being hydrogen or alkyl, and X being halogen.

β-Chloroethyl,β′-chlorovinyl
β-Chloropropyl,β′-chlorovinyl
β-Chlorobutyl,β′-chlorovinyl
β-Chlorohexyl,β′-chlorovinyl
β-Chlorononyl,β′-chlorovinyl
β-Chloroethyl,β′-chloropropenyl
β-Chloroethyl,β′-chlorobutenyl
β-Bromoethyl,β′-bromovinyl
β-Bromopropyl,β′-bromovinyl
β-Bromobutyl,β′-chloropropenyl The aliphatic β-haloalkyl ketones described are reacted with a metal acetylide, or a mono alkyl substituted metal acetylide wherein the alkyl groups have say between 1 and 7 carbon atoms. Alkali metal and alkaline earth metal acetylides have been found to be highly effective in this connection. Lithium acetylide, however, is preferred because it has been found to produce excellent yields without endangering polymerization of the unsaturated ketones. The acetylides are conveniently prepared by dissolving the free metal or metal amide in liquid ammonia and treating the resulting solution with a stream of acetylene or substituted acetylene to form the corresponding acetylide.

The metal acetylide acts as a condensing agent and provides the desired acetylenic group of the final product. It further acts as a dehydrohalogenation agent for the β-haloalkyl ketone, providing the desired alkenyl unsaturation in the product. To accomplish these purposes, at least two equivalents of the metal acetylide per mole of ketone are employed, a slight excess over and above such amount being preferred. When the above-described alkyl β-haloalkyl ketones are employed as the starting materials, two equivalents of the acetylide are necessary, one to form a double bond between the α and β carbon atoms of the ketone by removing the elements of hydrogen and halogen, and the other to condense with the resulting unsaturated ketone. For the same reasons, two equivalents of the metal acetylide are employed with the alkyl β,β-dihaloalkyl ketones and the β-haloalkyl, β′-haloalkenyl ketones, only one of the halogens being eliminated by the metal acetylide in each case. When employing the β,β′-dihaloalkyl ketones and the β,β,β′-trihaloalkyl ketones, three equivalents of the acetylide will act in like manner, two equivalents forming double bonds between the α and β, as well as the α′ and β′, carbon atoms of the ketones, and the third condensing with the resulting unsaturated ketones.

Liquid ammonia has been found to be particularly useful as a solvent for the reaction, but may be diluted with an inert solvent, say diethyl ether, without seriously detracting from the condensation reaction. In general, the reaction is conducted at about the boiling point of liquid ammonia, but when a low boiling solvent is used, temperatures up to about the boiling point of the solvent (e. g. diethyl ether) may be employed. The reactions are completed in a few hours and the products are isolated by removal of the solvent and the alkali or alkaline earth metal condensing agent. This is readily accomplished by allowing the ammonia to evaporate and by pouring the resulting suspension into a mixture of ice and a suitable acid, say acetic acid. The products are then readily extracted with ether, after which the resulting carbinols may be purified by distillation at reduced pressure.

The following examples are given by way of illustration and are not to be considered as the only manner in which this invention may be embodied.

EXAMPLE I

*Preparation of 3-ethyl-5-methylpentene-1-yn-4-ol-3 (ethyl vinyl propynyl carbinol)*

A solution of 7.7 grams (1.1 moles) of lithium in 800 ml. of liquid ammonia was treated with a stream of gaseous propyne until the blue color of the solution had disappeared. The stream of gas was discontinued shortly thereafter. A solution of 60.3 grams (0.5 mole) of ethyl-β-chloroethyl ketone in diethyl ether was then slowly added to the reaction mixture, and the mixture was allowed to reflux using a Dry-Ice condenser for a period of about three hours. Thereafter, it was diluted with diethyl ether, and the ammonia was allowed to evaporate. The residual solution was treated with a mixture of ice and acetic acid, from which the product was extracted with ether and purified by two distillations. A yield of 7.2 grams (11.6%) was obtained. The product boiled at 68–69° C. under a pressure of 14 mm.

*Analysis.*—Calcd. for $C_8H_{12}O$: C, 77.37; H, 9.74. Found: C, 77.16; H, 9.88.

This material has a solubility in water of about 6%. Its density is $D_4^{20}=0.905$. Its refractive index is $n_D^{25}=1.4670$.

EXAMPLE II

*Preparation of 3-isopropylpentene-1-yn-4-ol-3 (isopropyl vinyl ethinyl carbinol)*

Acetylene was passed into a stirred solution of lithium (7.7 grams; 1.1 moles) in liquid ammonia (800 cc.) until the blue color faded and the solution was clear of solid. To the resulting solution of lithium acetylide 67.3 grams (0.5 mole) of isopropyl β-chloroethyl ketone dissolved in 70 cc. of ether was added with stirring. An immediate precipitation of white solid (lithium chloride) was observed. After two hours at reflux, 300 cc. of ether was added, and the ammonia was allowed to evaporate overnight. The residual mixture was poured into a slurry of ice and acetic acid (35 grams). The aqueous layer was separated and extracted several times with 100 cc. portions of ether. The aqueous layer was then assayed for chloride ion and found to contain 0.493 mole (theory 0.50 mole). The combined ether extracts were washed with sodium bicarbonate solution and dried over anhydrous magnesium sulfate. Removal of ether and two distillations of the residue afforded 36.8 grams (59.3% yield) of pure isopropyl vinyl ethinyl carbinol, boiling point 65–66° C. (29 mm.); $n_D^{25}=1.4520$; $D_4^{20}=0.8923$.

*Analysis.*—Calcd. for $C_8H_{12}O$: C, 77.37; H, 9.74. Found: C, 77.53; H, 10.03.

EXAMPLE III

*Preparation of 3-n-butylpentene-1-yne-4-ol-3 (n-butyl vinyl ethinyl carbinol)*

The above product was prepared as in Example II from 74.3 grams (0.5 mole) of n-butyl β-chloroethyl ketone. A yield of 46.8 grams was obtained. The product boiled at 66–68° C. under a pressure of 9 mm. $n_D^{25}=1.4532$; $D_4^{20}=0.8773$.

*Analysis.*—Calcd. for $C_9H_{14}O$: C, 78.21; H, 10.21. Found: C, 78.26; H, 10.25.

EXAMPLE IV

*Preparation of 3-vinylpentene-1-yne-4-ol-3 (divinyl ethinyl carbinol)*

The above product was prepared as in Example II from 7.63 grams (1.10 moles) of lithium in 350 ml. of liquid ammonia and 52.0 grams (0.335 mole) of di-β-chloroethyl ketone. After two distillations, there was obtained 12.4 grams of divinyl ethinyl carbinol, boiling at 51–54° C. (16.5 mm.). $n_D^{25}=1.4676$; $D_4^{20}=0.918$.

*Analysis.*—Calcd. for $C_7H_8O$: C, 77.75; H, 7.46. Found: C, 77.29; H, 7.50.

EXAMPLE V

*Preparation of 3-vinyl-1-chloropentene-1-yne-4-ol-3 (vinyl β-chlorovinyl ethinyl carbinol)*

The above product was prepared as in Example II from 76.5 grams (0.5 mole) of β-chloroethyl, β′-chlorovinyl ketone in 75 ml. of ether. After distillation, 46.2 grams of pure product was obtained, boiling at 33–33.5° C. (0.2 mm.). $n_D^{25}=1.4960$; $D_4^{20}=1.103$.

*Analysis.*—Calcd. for $C_7H_7OCl$: C, 58.96; H, 4.95. Found: C, 58.70; H, 4.95.

Other compounds which are conveniently prepared by this method and which are particularly useful as hypnotic and/or anticonvulsant agents are 3-methylpentene-1-yne-4-ol-3 (methyl vinyl ethinyl carbinol), 3-ethylpentene-1-yne-4-ol-3 (ethyl vinyl ethinyl carbinol), 3-n-propylpentene-1-yne-4-ol-3 (n-propyl vinyl ethinyl carbinol), and 1-chloro-3-ethylpentene-1-yne-4-ol-3 (ethyl-β-chlorovinyl ethinyl carbinol).

Resort may be had to such modifications and equivalents as fall within the spirit of the invention and the scope of the appended claims.

We claim:

1. A process for preparing vinyl ethinyl tertiary carbinols which comprises condensing under anhydrous conditions an aliphatic β-haloalkyl ketone with at least 2 equivalents of a metal acetylide, the metal of said acetylide being selected from the group consisting of alkali metals and alkaline earth metals.

2. A process for preparing vinyl ethinyl tertiary carbinols which comprises condensing under anhydrous conditions an aliphatic β-haloalkyl ketone, having at least 1 hydrogen atom in the α position, with at least 2 equivalents of a metal acetylide selected from the group consisting of alkali metal and alkaline earth metal acetylides.

3. A process as claimed in claim 2 wherein the aliphatic β-haloalkyl ketone has the formula:

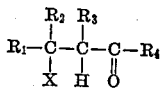

wherein $R_1$ is selected from the group consisting of halogen, hydrogen and alkyl groups having from 1 to 7 carbon atoms; $R_2$ and $R_3$ are selected from the group consisting of hydrogen and alkyl groups having from 1 to 7 carbon atoms; $R_4$ is selected from the group consisting of alkyl and alkenyl groups having from 1 to 7 carbon atoms; and X is halogen.

4. A process for preparing vinyl ethinyl tertiary carbinols which comprises condensing an alkyl β-haloalkyl ketone under anhydrous conditions in liquid ammonia with at least 2 equivalents of a metal acetylide selected from the group consisting of alkali metal and alkaline earth metal acetylides.

5. A process for preparing vinyl ethinyl tertiary carbinols which comprises condensing an alkyl β,β-dihaloalkyl ketone under anhydrous conditions in liquid ammonia with at least 2 equivalents of a metal acetylide selected from the group consisting of alkali metal and alkaline earth metal acetylides.

6. A process for preparing vinyl ethinyl tertiary carbinols which comprises condensing a β,β′-dihaloalkyl ketone under anhydrous conditions in liquid ammonia with at least 2 equivalents of a metal acetylide selected from the group consisting of alkali metal and alkaline earth metal acetylides.

7. A process for preparing vinyl ethinyl tertiary carbinols which comprises condensing a β,β,β′-trihaloalkyl ketone under anhydrous conditions in liquid ammonia with at least 2 equivalents of a metal acetylide selected from the group consisting of alkali metal and alkaline earth metal acetylides.

8. A process for preparing vinyl ethinyl tertiary carbinols which comprises condensing a β-haloalkyl, β′-haloalkenyl ketone under anhydrous conditions in liquid ammonia with at least 2 equivalents of a metal acetylide selected from the group consisting of alkali metal and alkaline earth metal acetylides.

9. A compound having the following structure:

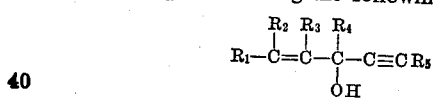

wherein $R_1$ is selected from the group consisting of chlorine, bromine, hydrogen and alkyl groups having from 1 to 7 carbon atoms; $R_2$, $R_3$, and $R_5$ are selected from the group consisting of hydrogen and alkyl groups having from 1 to 7 carbon atoms; and $R_4$ is an alkenyl group having from 1 to 7 carbon atoms.

10. 3-vinyl-pentene-1-yne-4-ol-3.

11. 3-vinyl-1-chloropentene-1-yne-4-ol-3.

References Cited in the file of this patent

UNITED STATES PATENTS

| | | |
|---|---|---|
| 2,232,867 | Reppe et al. | Feb. 25, 1941 |
| 2,425,201 | Oroshnik | Aug. 5, 1947 |
| 2,746,900 | Bavley et al. | May 22, 1956 |

FOREIGN PATENTS

| | | |
|---|---|---|
| 505,421 | Belgium | Sept. 15, 1951 |

OTHER REFERENCES

Hess et al.: Berichte d. d. c. Ges., vol. 54 (1921), page 2514.